US010567888B2

(12) United States Patent
Hertzberg et al.

(10) Patent No.: US 10,567,888 B2
(45) Date of Patent: Feb. 18, 2020

(54) DIRECTIONAL HEARING AID

(71) Applicant: Nuance Hearing Ltd., Tel Aviv (IL)

(72) Inventors: Yehonatan Hertzberg, Shoham (IL); Yaniv Zonis, Givatayim (IL); Omer Kotzer, Tel Aviv (IL); Ori Goren, Shoham (IL); Zohar Zisapel, Tel Aviv (IL)

(73) Assignee: NUANCE HEARING LTD., Tel Aviv (IL)

( * ) Notice: Subject to any disclaimer, the term of this patent is extended or adjusted under 35 U.S.C. 154(b) by 0 days.

(21) Appl. No.: 15/891,396

(22) Filed: Feb. 8, 2018

(65) Prior Publication Data

US 2019/0246218 A1 Aug. 8, 2019

(51) Int. Cl.
*H04R 25/00* (2006.01)
*H04R 29/00* (2006.01)
*G02C 11/06* (2006.01)

(52) U.S. Cl.
CPC .......... *H04R 25/405* (2013.01); *G02C 11/06* (2013.01); *H04R 25/407* (2013.01); *H04R 29/006* (2013.01); *H04R 25/305* (2013.01)

(58) Field of Classification Search
CPC ............ H04R 2225/41; H04R 2225/43; H04R 2225/61; H04R 25/407; H04R 25/604; H04R 25/65; H04R 29/004; H04R 1/1083; H04R 2225/63; H04R 2430/03; H04R 2430/21; H04R 2460/01; H04R 2499/11; H04R 25/405; H04R 25/554; H04N 5/23229; H04N 5/23232; H04N 7/18;
(Continued)

(56) References Cited

U.S. PATENT DOCUMENTS

| 3,119,903 A | 1/1964 | Rosemond et al. |
| 5,793,875 A * | 8/1998 | Lehr ............... H04R 25/554 |
| | | 381/313 |

(Continued)

FOREIGN PATENT DOCUMENTS

| KR | 20130054898 A | 5/2013 |
| WO | 2013169618 A1 | 11/2013 |

OTHER PUBLICATIONS

Widrow et al., "Microphone arrays for hearing aids: An overview", Speech Communication 39, pp. 139-146, 2003.

(Continued)

*Primary Examiner* — Lun-See Lao
(74) *Attorney, Agent, or Firm* — Kligler & Associates Patent Attorneys Ltd (57) ABSTRACT

Audio apparatus includes a neckband, which is sized and shaped to be worn around a neck of a human subject and includes left and right sides that rest respectively above the left and right clavicles of the human subject wearing the neckband. First and second arrays of microphones are disposed respectively on the left and right sides of the neckband and configured to produce respective electrical signals in response to acoustical inputs to the microphones. One or more earphones are worn in the ears of the human subject. Processing circuitry is coupled to receive and mix the electrical signals from the microphones in the first and second arrays in accordance with a specified directional response relative to the neckband so as to generate a combined audio signal for output via the one or more earphones.

14 Claims, 4 Drawing Sheets

(58) Field of Classification Search
CPC ...... H04N 7/181; H04N 7/188; H04N 9/8042; H04N 9/8205; H04W 4/02; H04W 4/80; H04W 4/023; H04W 4/008; H04W 4/025; H04W 4/027; H04W 4/029; H04W 4/16; H04W 12/06; H04W 4/00
USPC ......... 381/26, 1, 58, 60, 300, 370, 312, 313, 381/385, 322, 327, 330, 71.1, 71.6, 92, 381/314, 74
See application file for complete search history.

(56) References Cited

U.S. PATENT DOCUMENTS

| | | | |
|---|---|---|---|
| 7,031,483 B2 | 4/2006 | Boone et al. | |
| 7,099,486 B2 | 8/2006 | Julstrom et al. | |
| 7,609,842 B2 | 10/2009 | Sipkema et al. | |
| 7,735,996 B2 | 6/2010 | Van Der Zwan et al. | |
| 8,139,801 B2 | 3/2012 | Sipkema et al. | |
| 9,113,245 B2 * | 8/2015 | Gelhard | H04R 5/033 |
| 9,282,392 B2 * | 3/2016 | Ushakov | H04R 1/1033 |
| 9,288,589 B2 * | 3/2016 | Cheung | H04R 25/554 |
| 9,392,381 B1 | 7/2016 | Park et al. | |
| 9,812,116 B2 * | 11/2017 | Ushakov | H04R 1/1033 |
| 2004/0076301 A1 * | 4/2004 | Algazi | H04S 7/304 381/17 |
| 2008/0192968 A1 | 8/2008 | Ho et al. | |
| 2009/0323973 A1 * | 12/2009 | Dyba | H04R 29/00 381/58 |
| 2011/0091057 A1 | 4/2011 | Derkx et al. | |
| 2011/0293129 A1 | 12/2011 | Dillen et al. | |
| 2012/0128175 A1 | 5/2012 | Visser et al. | |
| 2014/0093091 A1 * | 4/2014 | Dusan | H04R 1/1083 381/74 |
| 2014/0093093 A1 | 4/2014 | Dusan et al. | |
| 2014/0270316 A1 | 9/2014 | Kopina et al. | |
| 2015/0036856 A1 | 2/2015 | Pruthi et al. | |
| 2015/0049892 A1 | 2/2015 | Petersen et al. | |
| 2015/0201271 A1 * | 7/2015 | Diethorn | H04R 1/10 381/375 |
| 2015/0230026 A1 | 8/2015 | Eichfeld et al. | |
| 2015/0289064 A1 | 10/2015 | Jensen et al. | |
| 2017/0272867 A1 | 9/2017 | Zisapel et al. | |
| 2018/0359294 A1 * | 12/2018 | Brown | H04L 65/403 |

OTHER PUBLICATIONS

Bose Hearphonestm™ .,"Hear Better", 3 pages, Feb. 19, 2017.
U.S. Appl. No. 15/470,930 office action dated Mar. 7, 2018.
U.S. Appl. No. 15/470,930 office action dated Sep. 14, 2018.
Veen et al., "Beamforming Techniques for Spatial Filtering", CRC Press, 23 pages, 1999.
International Application # PCT/IB2018/060598 search report dated Apr. 30, 2019.

* cited by examiner

DIRECTIONAL HEARING AID

FIELD OF THE INVENTION

The present invention relates generally to hearing aids, and particularly to devices and methods for improving directional hearing.

BACKGROUND

Speech understanding in noisy environments is a significant problem for the hearing-impaired. Hearing impairment is usually accompanied by a reduced time resolution of the sensorial system in addition to a gain loss. These characteristics further reduce the ability of the hearing-impaired to filter the target source from the background noise and particularly to understand speech in noisy environments.

Some newer hearing aids offer a directional hearing mode to improve speech intelligibility in noisy environments. This mode makes use of an array of microphones and applies beamforming technology to combine multiple microphone inputs into a single, directional audio output channel. The output channel has spatial characteristics that increase the contribution of acoustic waves arriving from the target direction relative to those of the acoustic waves from other directions. Widrow and Luo survey the theory and practice of directional hearing aids in "Microphone arrays for hearing aids: An overview," *Speech Communication* 39 (2003), pages 139-146, which is incorporated herein by reference.

PCT International Publication WO 2017/158507, whose disclosure is incorporated herein by reference, describes hearing aid apparatus, including a case, which is configured to be physically fixed to a mobile telephone. An array of microphones are spaced apart within the case and are configured to produce electrical signals in response to acoustical inputs to the microphones. An interface is fixed within the case, along with processing circuitry, which is coupled to receive and process the electrical signals from the microphones so as to generate a combined signal for output via the interface. In some embodiments, the processing circuitry mixes the electrical signals in accordance with a directional response that is dependent on the angular orientation of the case, and thus generates audio output to an earphone (or pair of earphones) worn by the user.

SUMMARY

Embodiments of the present invention that are described hereinbelow provide improved hearing aids and methods for enhancing hearing aid performance.

There is therefore provided, in accordance with an embodiment of the invention, audio apparatus, including a neckband, which is sized and shaped to be worn around a neck of a human subject and includes left and right sides that rest respectively above the left and right clavicles of the human subject wearing the neckband. First and second arrays of microphones are disposed respectively on the left and right sides of the neckband and configured to produce respective electrical signals in response to acoustical inputs to the microphones. One or more earphones are configured to be worn in the ears of the human subject. Processing circuitry is coupled to receive and mix the electrical signals from the microphones in the first and second arrays in accordance with a specified directional response relative to the neckband so as to generate a combined audio signal for output via the one or more earphones.

In a disclosed embodiment, the neckband is rigid. Additionally or alternatively, the neckband has an opening between the left and right sides, which opens in a frontal direction when worn around the neck of the human subject. In one embodiment, the one or more earphones are connected by one or more wires to the neckband.

In some embodiments, the processing circuitry is configured to mix the electrical signals so as to generate the combined audio signal in accordance with a directional response that defines a beam direction relative to the neckband and an angular aperture around the beam direction, such that the acoustical inputs within the angular aperture are emphasized in the combined audio signal, while suppressing the acoustical inputs outside the angular aperture. In a disclosed embodiment, the processing circuitry is configured to detect an angle of orientation of a head of the human subject relative to the neckband, and to adjust the beam direction responsively to the detected angle. Additionally or alternatively, the processing circuitry is configured to adjust the directional response so as to suppress a contribution of speech by the human subject to the combined audio signal.

In a disclosed embodiment, each of the first and second arrays of microphones includes at least four microphones. Additionally or alternatively, the microphones and the processing circuitry are embedded in the neckband.

There is also provided, in accordance with an embodiment of the invention, audio apparatus, including a frame, which is sized and shaped to be worn on a part of a body of a human subject. An array of microphones are distributed at different, respective locations on the frame and configured to produce respective electrical signals in response to acoustical inputs to the microphones. One or more earphones are configured to be worn in the ears of the human subject. Sensing and processing circuitry is configured to detect an angle of orientation of a head of the human subject relative to the frame, and is coupled to receive and mix the electrical signals from the microphones in accordance with a directional response that is adjusted responsively to the detected angle of orientation of the head so as to generate a combined audio signal for output via the one or more earphones.

In some embodiments, the sensing and processing circuitry includes at least one first magnetic field transducer fixed to at least one of the earphones, at least one second magnetic field transducer fixed to the frame, and a processor, which is configured to sense a mutual inductance between the first and second magnetic field transducers, and to detect the angle of orientation of the head responsively to the sensed mutual inductance. In a disclosed embodiment, the first and second magnetic field transducers include coils, and the processor is configured to drive one of the coils to generate a magnetic field, and to detect the angle of orientation by sensing an induced signal that is output by another of the coils in response to the magnetic field.

Additionally or alternatively, the sensing and processing circuitry includes a memory, which stores respective sets of beamforming coefficients that are precomputed for a plurality of different, predefined angles of orientation of the head, and a processor, which is configured to select the sets of beamforming coefficients from the memory responsively to the detected angle of orientation of the head, and to apply the selected sets of the beamforming coefficients to the electrical signals produced by the microphones in order to generate the combined audio signal. In a disclosed embodiment, the processor is configured to interpolate between the beamforming coefficients in two or more of the sets in order to adjust the directional response of the combined audio signal as the head turns.

In a disclosed embodiment, the frame includes a neckband, which is sized and shaped to be worn around a neck of the human subject.

There is additionally provided, in accordance with an embodiment of the invention, audio apparatus, including a frame, which is sized and shaped to be worn on a body of a human subject. An array of microphones are distributed at different, respective locations on the frame and configured to produce respective electrical signals in response to acoustical inputs to the microphones. One or more earphones are configured to be worn in the ears of the human subject. Processing circuitry is coupled to receive and mix the electrical signals from the microphones in order to generate a combined audio signal having a specified directional response by applying beamforming coefficients to the electrical signals produced by the microphones, while testing a noise level in the respective electrical signals and upon detecting that the noise level produced by a given microphone has exceeded a predefined threshold, substituting an electrical signal from a neighboring microphone for that of the given microphone in generating the combined audio signal.

In a disclosed embodiment, the combined audio signal is generated with a predefined latency relative to receiving the electrical signals from the microphones, and the processing circuitry is configured to substitute the electrical signal from the neighboring microphone for that of the given microphone within a switching time that is less than the predefined latency.

Additionally or alternatively, the processing circuitry is configured to adjust the beamforming coefficients so as to suppress a contribution of speech by the human subject to the combined audio signal.

There is further provided, in accordance with an embodiment of the invention, a method for hearing assistance, which includes providing a neckband, which is sized and shaped to be worn around a neck of a human subject and includes left and right sides that rest respectively above the left and right clavicles of the human subject wearing the neckband, with first and second arrays of microphones disposed respectively on the left and right sides of the neckband. Respective electrical signals output by the microphones in the first and second arrays are received and mixed in accordance with a specified directional response relative to the neckband so as to generate a combined audio signal. The combined audio signal is output via one or more earphones configured to be worn in the ears of the human subject.

There is moreover provided, in accordance with an embodiment of the invention, a method for hearing assistance, which includes providing a frame, which is sized and shaped to be worn on a part of a body of a human subject, with an array of microphones distributed at different, respective locations on the frame. An angle of orientation of a head of the human subject relative to the frame is detected. Respective electrical signals output by the microphones are received and mixed in accordance with a directional response that is adjusted responsively to the detected angle of orientation of the head so as to generate a combined audio signal. The combined audio signal is outputted via one or more earphones configured to be worn in the ears of the human subject.

There is furthermore provided, in accordance with an embodiment of the invention, a method for hearing assistance, which includes providing a frame, which is sized and shaped to be worn on a body of a human subject, with an array of microphones, distributed at different, respective locations on the frame. Respective electrical signals output by the microphones are received and mixed in order to generate a combined audio signal having a specified directional response by applying beamforming coefficients to the electrical signals produced by the microphones. A noise level in the respective electrical signals is tested, and upon detecting that the noise level produced by a given microphone has exceeded a predefined threshold, an electrical signal from a neighboring microphone is substituted for that of the given microphone in generating the combined audio signal, which is outputted via one or more earphones configured to be worn in the ears of the human subject.

The present invention will be more fully understood from the following detailed description of the embodiments thereof, taken together with the drawings in which:

DETAILED DESCRIPTION OF EMBODIMENTS

Overview

Despite the need for directional hearing assistance and the theoretical benefits of microphone arrays in this regard, in practice the directional performance of hearing aids falls far short of that achieved by natural hearing. In general, good directional hearing assistance requires a relatively large number of microphones, spaced well apart, in a design that is both unobtrusive and enables the user to aim the directional response of the hearing aid easily toward a point of interest, such as toward a conversation partner in noisy environment. Many people are put off, however, by the aesthetic appearance of personal accessories, such as spectacle frames and necklaces, that contain hearing-aid microphone arrays.

In some embodiments of the present invention, the shortcomings of existing solutions are addressed by configuring a directional hearing aid as a neckband, which may have an appearance similar to neckband-based entertainment headsets that are currently in wide use. The neckband is sized and shaped to be worn around the neck of a human subject, with left and right sides that rest respectively above the left and right clavicles of the subject and one or more earphones connected (by wires or wireless links) to the neckband. Arrays of microphones are embedded in or otherwise disposed on the left and right sides of the neckband and receive acoustical inputs from the environment of the subject. Processing circuitry, which may also be embedded in the neckband, receives and mixes the electrical signals output by the microphones in accordance with a specified directional response relative to the neckband, and thus generates a combined audio signal for output via the earphones.

Typically, the directional response has a beam direction, which is defined relative to the neckband, and an angular aperture such that the acoustical inputs within the angular aperture around the beam direction are emphasized in the combined audio signal, the acoustical inputs outside the angular aperture are suppressed. In some embodiments, the processing circuitry detects the angle of orientation of the subject's head relative to the neckband and adjusts the beam direction accordingly. In this manner, the beam direction will point in the direction in which the subject is looking, for example toward a conversation partner or some other point of interest.

Various sensors can be used to detect the angle of orientation of the head relative to the neckband. In one embodiment, magnetic field transducers, such as coils, are embedded in or otherwise fixed to the neckband and at least one of the earphones. The processing circuitry detects the angle of orientation of the head by sensing the mutual inductance between the transducers in the earphones and those in the neckband, which varies as a function of the angle between them. For example, one or more of the transducers can be driven to generate a magnetic field, and the processing circuitry can detect the angle of orientation of the head relative to the neckband by sensing the induced signal that is output by the other transducers in response to the magnetic field.

In changing the beam direction as the subject turns his or her head (relative to the neckband and the microphone array), it is desirable that the processing circuitry adjust the beamforming coefficients quickly and smoothly, so that the subject is not disturbed by lags or sudden jumps in response of the hearing aid. Therefore, in some embodiments, multiple sets of beamforming coefficients are precomputed for different, predefined angles of the head and are stored in a memory, for example in the neckband. The processing circuitry can then quickly select and load the appropriate set of beamforming coefficient for any of the predefined angles and can interpolate between the sets of coefficients in order to handle intermediate angles.

Another problem that can arise in directional hearing aids in which microphones are arrayed around a wearable frame, such as a neckband, is that the subject tends to touch the frame. When the subject touches one of the microphones or touches the hole in the frame through which an embedded microphone receives its acoustical input, the noise level in the electrical signal output by the microphone will suddenly increase and can severely degrade the combined audio signal that is output to the earphone.

To alleviate this problem, in some embodiments of the present invention, the processing circuitry continually tests the noise level in the electrical signals output by the microphones. When the processing circuitry detects that the noise level produced by a given microphone has exceeded a predefined threshold, it substitutes the electrical signal from a neighboring microphone for that of the given microphone in generating the combined audio signal. Switching the microphone signals in this manner is simple to implement and has less effect on the combined audio signal than would silencing the noisy microphone or substituting some other, default signal. The substitution of signals can be performed rapidly, typically within a switching time that is less than the beamforming latency (for example, a few milliseconds), so that the change in the combined audio signal that the subject perceives is minimal or nonexistent.

Hearing aids in general, and especially hearing aids with microphones located near the user's mouth, suffer from an increased volume of self-speech, i.e., speech by the subject using the hearing aid. When the user speaks, he hears himself differently and more loudly through the hearing aid. This phenomenon causes discomfort to the user. Therefore, in some embodiments, of the present invention, the processing circuitry of the hearing aid adjusts the beamforming coefficients that determine the directional response so as to reduce the gain of the self-speech in the combined audio signal that is output by the hearing aids. Specifically, the processing circuitry measures the transfer function of the self-speech and adds it to the beamformer algorithm noise component, which is subtracted out of the combined audio signal, thus suppressing the contribution of self-speech.

System Description

Figure 1:
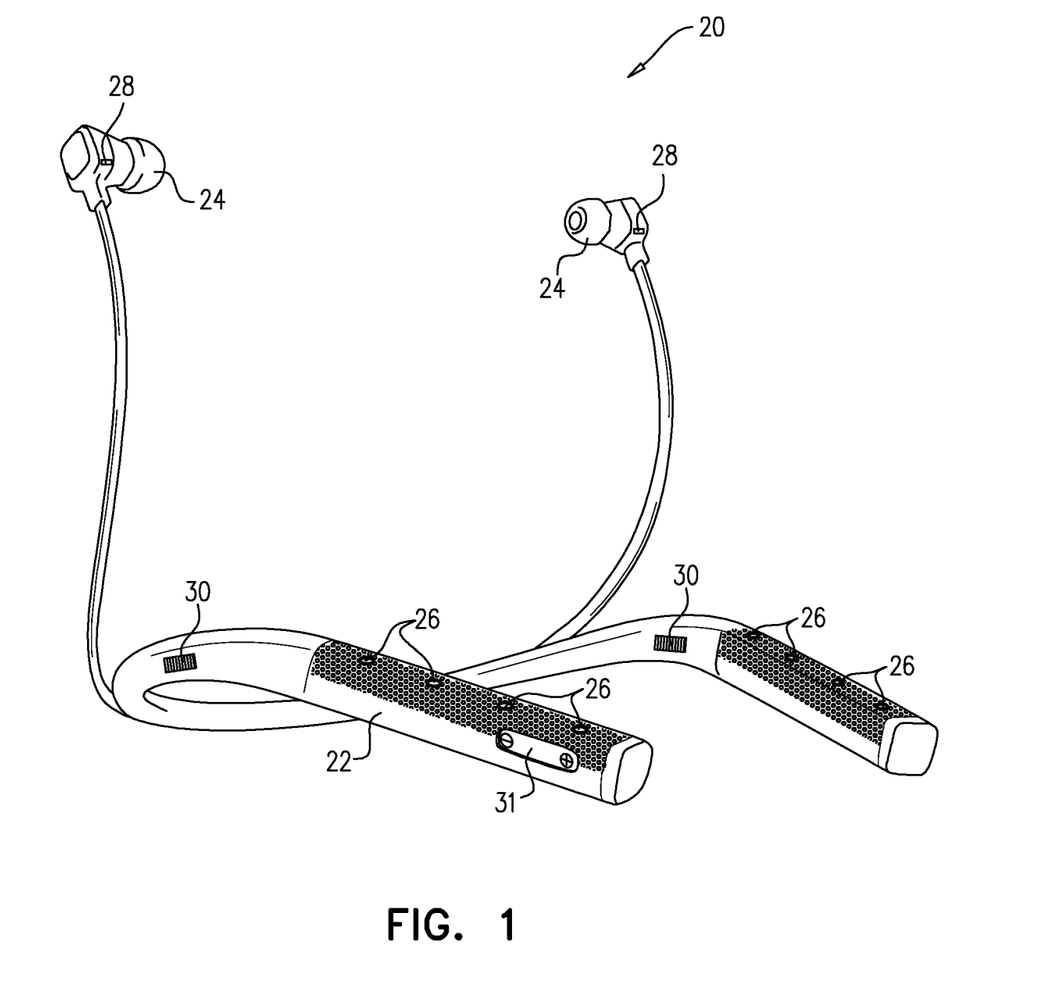
FIG. 1 is a schematic pictorial illustration showing a directional hearing aid, in accordance with an embodiment of the invention.
Figure 2:
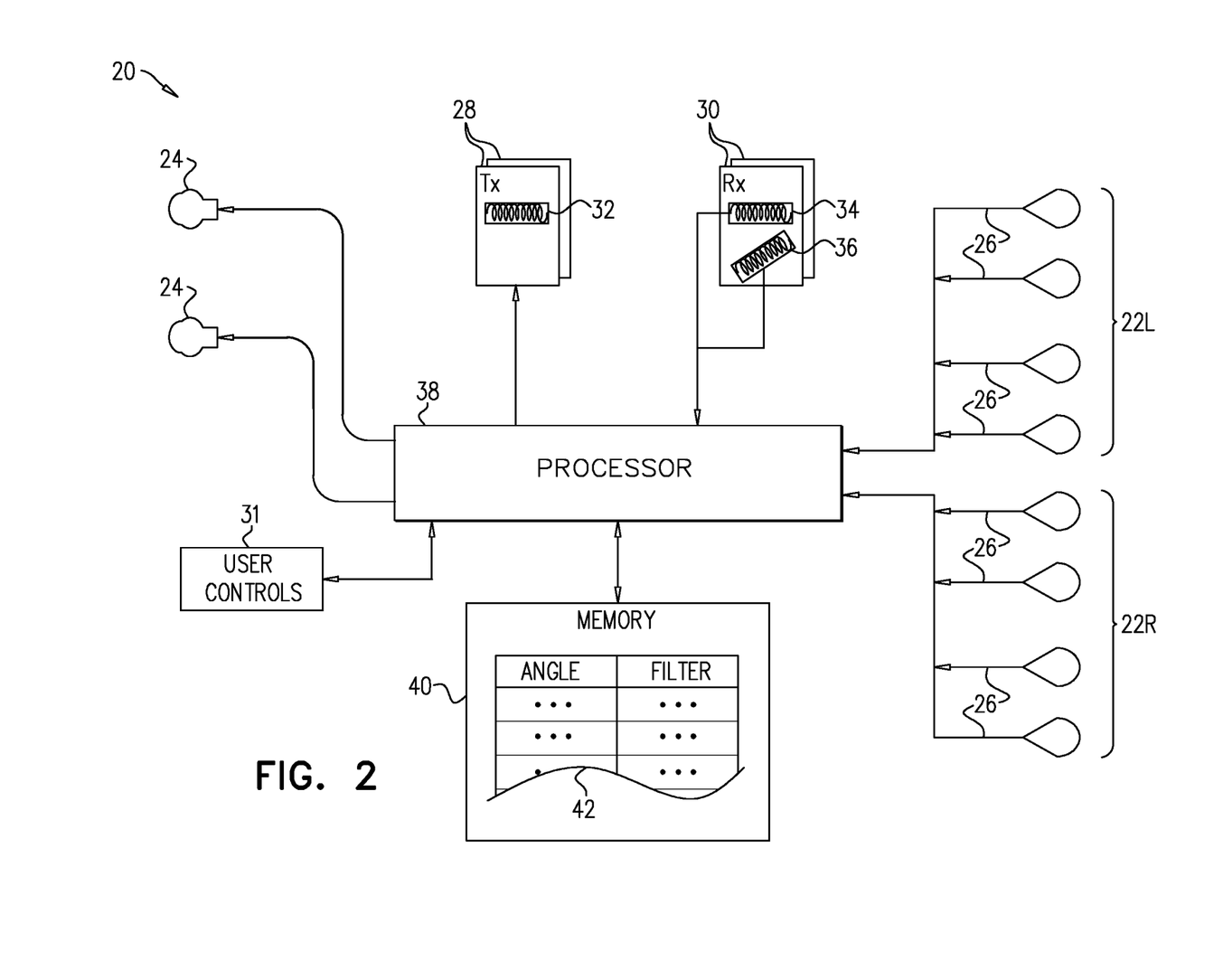
FIG. 2 is a block diagram that schematically shows details of a directional hearing aid, in accordance with an embodiment of the invention.

Reference is now made to FIGS. 1 and 2, which schematically illustrate a directional hearing aid 20, in accordance with an embodiment of the invention. FIG. 1 is a pictorial illustration, while FIG. 2 is a block diagram showing functional components of the hearing aid. In this embodiment, hearing aid 20 is based on a neckband 22, which is sized and shaped to be worn around the neck of a human subject and includes left and right sides (labeled 22L and 22R in FIG. 2), which rest respectively above the left and right clavicles of the subject wearing the neckband. The inventors have found the use of a neckband for this purpose to be advantageously both functionally and aesthetically, Alternatively, however, some of the features of the embodiments described herein may be implemented, mutatis mutandis, in hearing aids that are based on other sorts of frames that can be worn on the body, such as a spectacle frame, a closed necklace, a belt, or an implement that is clipped to or embedded in the subject's clothing.

Neckband 22 is generally rigid, or at least the right and left sides, in which arrays of microphones 26 are embedded, are sufficiently rigid to maintain fixed spatial relations between the microphones. Neckband 22 has an opening between the left and right sides, which opens in the frontal direction when the neckband is worn around the neck. In the pictured embodiment, four microphones 26 are embedded in each side of neckband 22, spaced apart by about 20 mm between each microphone and its neighbor(s). The inventors have found that this arrangement gives good directionality in the beamforming response of the combined audio signal; but alternatively, larger or smaller numbers of microphones may be used, with larger or smaller spacing between them. Microphones 26 may comprise any suitable type of acoustic transducers that are known in the art, such as MEMS devices or miniature piezoelectric transducers, for example. (The term "acoustic transducer" is used broadly, in the context of the present patent application, to refer to any device that converts acoustic waves into an electrical signal, or vice versa.)

Earphones 24 are connected by wires to neckband 22, in which the processing circuitry of hearing aid 20 (shown in FIG. 2) is typically embedded. Sensing circuitry, including one or more magnetic field transmitters 28 and one or more magnetic field receivers 30, is embedded in or otherwise attached to earphones 24 and neckband 22 for purposes of sensing head direction relative to the neckband. In the pictured embodiment, transmitters 28 are embedded in earphones 24, while receivers 30 are embedded in neckband 22, but alternatively the positions of the transmitters and receivers may be reversed. Transmitters 28 in this example each comprise a single coil 32, while receivers 30 each comprise a pair of orthogonal coils 34 and 36. Alternatively, the sensing circuitry may comprise larger or smaller numbers of coils, in different arrangements, or magnetic transducers of other types.

User controls 31 enable the subject to adjust functions of hearing aid 20, such as the volume of the audio output signal and possibly beamforming parameters, such as the width of the angular aperture.

As shown in FIG. 2, hearing aid 20 comprises processing circuitry, including a processor 38 and a memory 40, which are typically embedded in neckband 22. Processor 38 can be implemented in a single integrated circuit chip, which may also include memory 40. Alternatively, the functions of the processing circuitry may be distributed among multiple chips, which may be located within or outside neckband 22. Typically, processor 38 comprises an analog/digital converter, which digitizes the analog electrical signals output by microphones 26, along with digital processing circuitry for combining the digitized signals while applying the appropriate beamforming function. Processor 38 converts the combined signal to analog form in order to generate the audio output to earphones 24. (Alternatively, a single earphone may be sufficient for some users.)

Processor 38 typically comprises suitable programmable logic components, such as a digital signal processor or a gate array, which implement the necessary filtering and mixing functions using the appropriate beamforming coefficients. Alternatively or additionally, processor 38 may comprise a neural network, which is trained to determine and apply the beamforming coefficients. Further alternatively or additionally, processor 38 comprises a microprocessor, which is programmed in software or firmware to carry out at least some of the functions that are described herein.

Processor 38 may apply any suitable beamforming function that is known in the art in mixing the signals that are output by microphones 26, such as the algorithms described in the above-mentioned article by Widrow and Luo. The algorithm may be applied equivalently in either the time domain or the frequency domain. For example, a time delay algorithm may be used to combine the electrical signals with time shifts equal to the propagation times of the acoustic waves between the microphone locations with respect to the desired beam direction. Alternatively, a Minimum Variance Distortionless Response (MVDR) beamforming algorithm may be applied in order to achieve better spatial resolution. Other applicable beamforming techniques are based on Linear Constraint Minimum Variance (LCMV) and General Sidelobe Canceller (GSC) algorithms. Such beamforming algorithms, as well as other audio enhancement functions that can be applied by processor 38, are further described in the above-mentioned PCT International Publication WO 2017/158507.

Processor 38 interacts with transmitter 28 and receiver 30 in order to detect the angle of orientation of the head of the subject wearing hearing aid 20, and applies the detected angle in choosing the beamforming coefficients to be used in combining the microphone signals into the audio output signal. As noted earlier, the beamforming function has a directional response, which defines a beam direction relative to neckband 22 and an angular aperture around the beam direction. The beamforming function emphasizes the acoustical inputs that are within the angular aperture, while suppressing acoustical inputs outside the angular aperture.

In the embodiment that is shown in FIG. 2, the beamforming coefficients are precomputed and stored in a table 42 in memory 40. For this purpose, it is useful that memory 40 comprise a high-speed nonvolatile memory array, such as a flash memory, so that processor 38 can access table 42 at high speed. The beamforming coefficients are precomputed for a number of different, predefined angles of orientation of the head relative to neckband 22. The beamforming coefficients may be preset for all users, or they may be calibrated individually for each user and stored in table 42. Processor 38 selects the sets of beamforming coefficients from table 42 based on the angle of orientation of the head indicated by the signals from receiver 30.

Methods of detection of the head orientation and its application in adjusting the beam direction of the beamforming function are described further hereinbelow with reference to FIGS. 3 and 4.

Methods of Operation

Figure 3A:
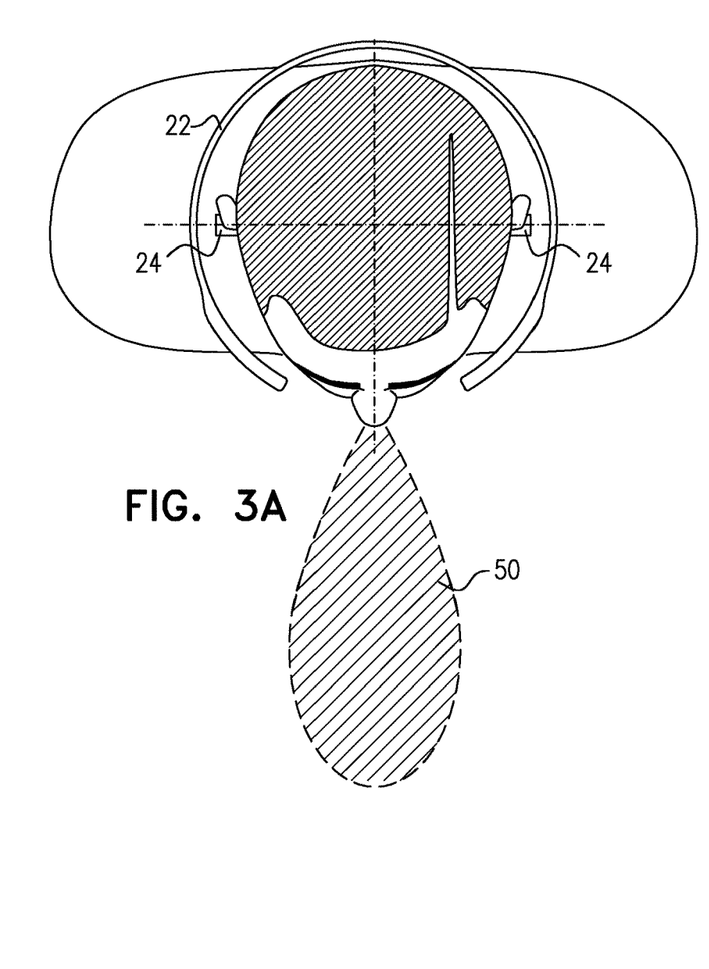
FIGS. 3A and 3B are schematic top views of a human subject wearing a directional hearing aid, showing beamforming lobes in two different orientations of the subject's head, in accordance with an embodiment of the invention.
Figure 3B:
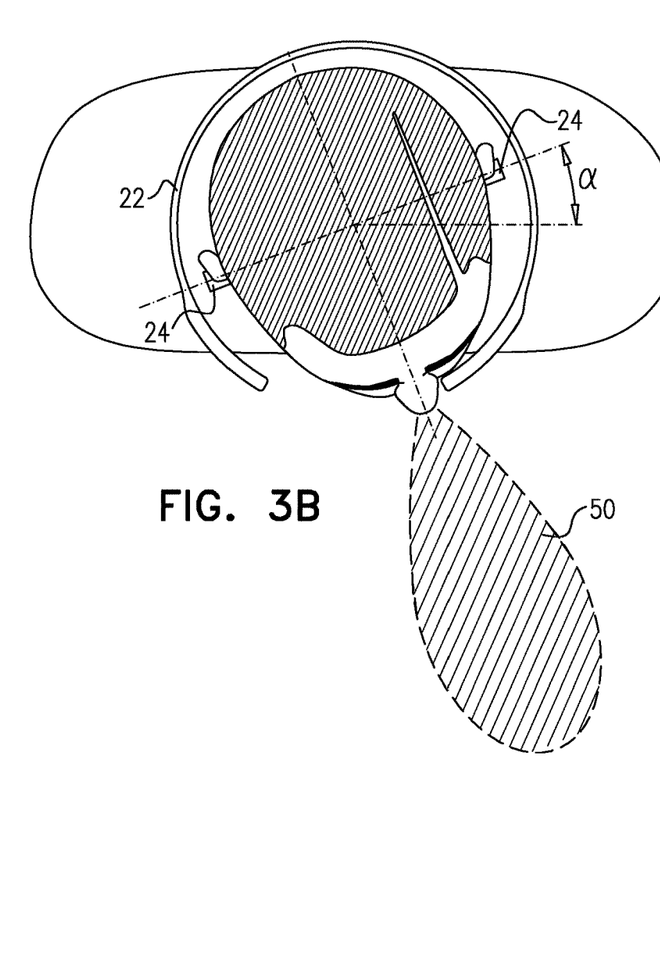

FIGS. 3A and 3B are schematic top views of a human subject wearing a directional hearing aid, showing beamforming lobes 50 in two different orientations of the subject's head, in accordance with an embodiment of the invention. In FIG. 3B, the subject has rotated his head by an azimuthal angle a, relative to the position shown in FIG. 3B, while his body, and hence neckband 22, has remained stationary. Processor 38 detects the change in the angle of orientation of the head, based on the rotation of earphones 24 relative to neckband 22, and adjusts the directional response of the beamforming function accordingly. This adjustment is reflected by the change in the beam direction, corresponding to the central axis of lobe 50.

To sense the angle of earphones 24, processor drives coils 32 in transmitters 28 to generate magnetic fields and senses the signals induced in coils 34 and 36 of receiver 30. The magnitudes of the induced signals are indicative of the relative angles between coil 32 and each of coils 34 and 36. For example, processor 38 may compute the angle of rotation of earphones 24 relative to neckband 22 by taking the inverse tangent of the ratio of the magnitudes of the respective signals received from coils 34 and 36. Alternatively, other, more complex algorithms that are known in the art of magnetic position sensing can be used for this purpose. The choice and details of the algorithm also depend on the relative numbers and positions of the coils that are used in transmitting and receiving the magnetic fields.

To enhance the sensitivity and precision of the detection of rotation angle, processor typically drives coil 32 at a predefined frequency, and then filters the signals received from coils 34 and 36 with a filter (analog or digital) that is tuned to the same frequency. Coil 32 in the left earphone 24 may be driven at a different frequency from that of the right earphone in order to avoid interference between the signals induced by the corresponding magnetic fields. The impedances of the analog drive and sensing circuits (not shown in the figures) in transmitters 28 and receivers 30 are typically matched to the impedances of coils 32, 34 and 36 in order to increase sensitivity and reduce noise.

Although the example described above relates to detection of the azimuthal angle of the subject's head (which is generally the key angle in adjusting the beam direction of hearing aid 20), processor 38 may additionally process the signals induced in receivers 30 in order to detect other angular coordinates. For example, the processor may calculate the pitch angle of the head and adjust the beam direction of lobe 50 up and down accordingly.

In addition, as noted above, processor 38 can also adjust the beamforming coefficients so as to reduce the gain of the self-speech component in the combined audio signal that is output to earphones 24. For this purpose, the processor 38 measures the transfer function of the self-speech and adds it to the beamformer algorithm noise component, which is then subtracted out of the combined audio signal.

Using the above-mentioned MVDR beamformer, for example, processor 38 minimizes the contribution of background noise by an optimization process based on minimizing the function U(f), which is defined as follows:

$$\min U(f) = F^H(f) S_{zz}^H(f) F(f),$$

$F(f)$ subject to the condition: $F^T(f) W(f) = 1$.

Here F(f) represents the response of the filters applied by processor 38 at frequency f, $S_{zz}(f)$ is the cross-spectral density matrix for background noise, W(f) is a vector representing the acoustic transfer function between the beamforming target and the microphone array, and the superscripts H and T represent the Hermitian and transpose, respectively. Inverting $S_{zz}(f)$ to give $S_{ZZ}^{-1}(f)$, and solving the above optimization problem gives a set of MVDR filters, $F_0$, defined as:

$$F_0^T(f) = \frac{W^H(f) S_{ZZ}^{-1}(f)}{W^H(f) S_{ZZ}^{-1}(f) W(f)}.$$

The cross-spectral density matrix Szz is derived from the STFT (short-time Fourier transform) of a set of acoustic recordings x:

$$S_{xy}(f) = \sum_{i=0}^{L} STFT_x^i(f) STFT_y^i(f)^*$$

$$STFT_x^i(f) = \sum_{n=0}^{K} x[n + iK] e^{-i2\pi f n}$$

wherein L is the length of the acoustic recording and K is the short time of the Fourier transform. Calculating $S_{zz}(f)$ for self-speech to a nearby microphone array can be difficult since it requires a three-dimensional acoustic model of the human vocal system and body. To overcome this difficulty, an initial calibration step can be added, in which processor 38 records the transfer function of the subject's self-speech, using microphones 26 in a quiet environment and thus derives the cross-spectral density matrix from real measurements.

Figure 4:
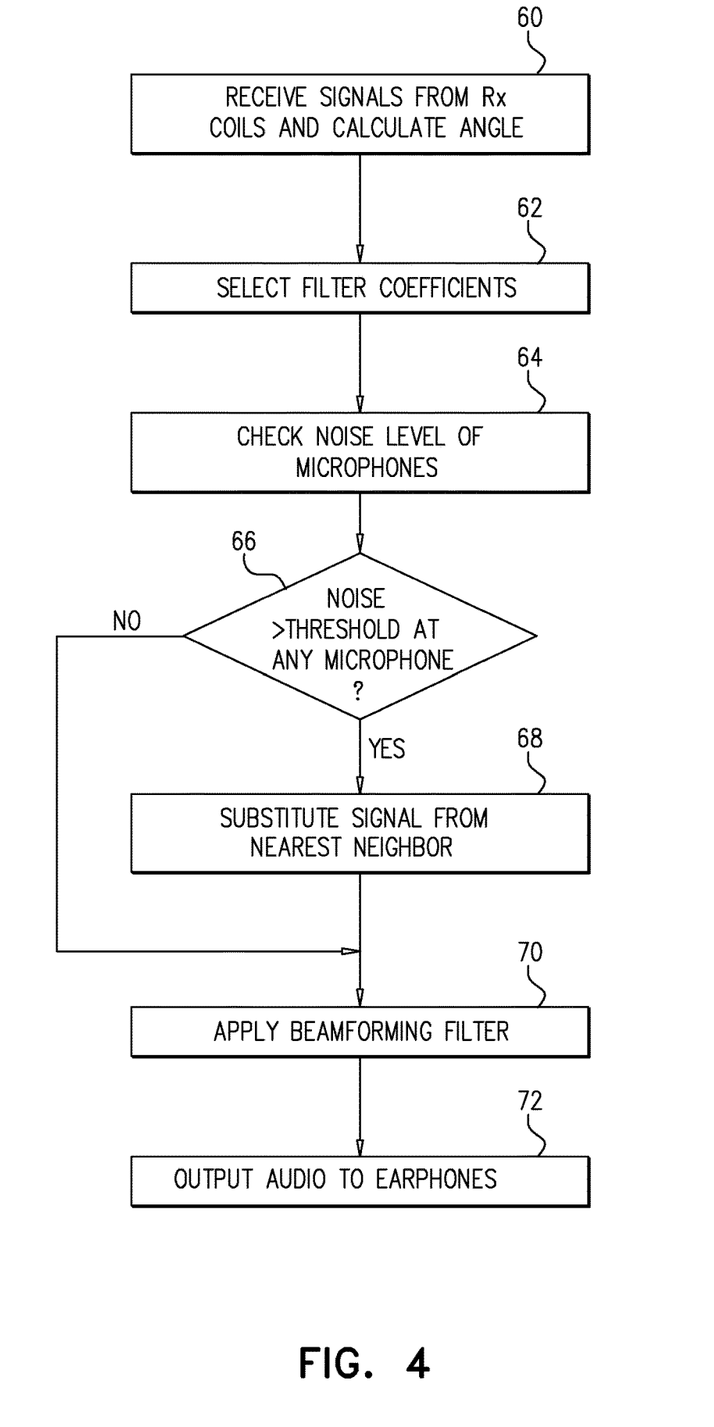
FIG. 4 is a flow chart that schematically illustrates a method for operation of a directional hearing aid, in accordance with an embodiment of the invention.

FIG. 4 is a flow chart that schematically illustrates a method for operation of a directional hearing aid, in accordance with an embodiment of the invention. The method is described, for the sake of concreteness and clarity, with reference to the components of hearing aid 20, as shown in the preceding figures. Alternatively, features of this method may be applied, mutatis mutandis, to other suitable sorts of directional hearing aids that are known in the art. Although the steps of the method are shown in FIG. 4 as occurring sequentially, in practice these steps may be carried out in parallel and are repeated continually at short intervals during the operation of the hearing aid.

Processor 38 receives signals from coils 34, 36 in receivers 30, and calculates the angle of rotation of the subject's head relative to neckband 22, at an angle computation step 60. Based on the calculated angle, processor 38 selects the beamforming filter coefficients that are to be applied to the electrical signals that are output by microphones, at a filter selection step 62. In the present example, processor 38 looks up the head angle in table 42 in memory 40 and selects the appropriate filter coefficients from the table. When the calculated head angle falls between the angles listed in two of the entries in table 42, processor 38 may either choose the nearest tabulated angle or, for greater precision, may read out two (or more) sets of coefficients and compute the current beamforming filter coefficients by interpolating between the coefficients in the two (or more) sets.

Processor 38 also tests the level of noise in the electrical signal output by each of microphones 26, at a noise checking step 64. Specifically, processor 38 detects sudden increases in noise level that can result when the subject touches one of the microphones or touches the acoustic channel in neckband 22 through which the microphone receives sound. Such changes can be identified, for example, by detecting marked differences in the outputs of the different microphones, since touch-induced noise will affect only a single microphone, in contrast to background noise, which affects all of them.

Processor 38 compares the level of suspected touch-induced noise to a predefined threshold, at a noise comparison step 66. Upon detecting that the noise level from a given microphone 26 has exceeded the threshold, processor 38 effectively mutes the microphone in question and substitutes the electrical signal from a neighboring microphone for that of the given microphone, at a signal substitution step 68. The testing and decision process of steps 64-68 can be carried out quickly, for example within a switching time that is less than the latency of the beamforming filter that is applied by processor 38 in generating the combined audio output signals (typically a few milliseconds, as noted above). Consequently, the touch-induced noise generated by the subject and the signal substitution used in suppressing this noise will be largely imperceptible to the subject.

After having selected the appropriate beamforming filter coefficients at step 62, and substituted signals as necessary to suppress noise at step 68, processor 38 applies the respective beamforming filter coefficients to the digitized electrical signals received from microphones 26, at a filtering step 70. Processor 38 combines the filtered signals to generate a digital audio signal having a directional response corresponding to the head angle that was calculated at step 60. Processor 38 converts this combined digital signal to analog audio form, and outputs the resulting audio signal to earphones 24.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Audio apparatus, comprising: a frame, which is sized and shaped to be worn on a part of a body of a human subject; an array of microphones, distributed at different, respective locations on the frame and configured to produce respective electrical signals in response to acoustical inputs to the microphones; one or more earphones configured to be worn in the ears of the human subject; and sensing and processing circuitry, which is configured to detect an angle of orientation of a head of the human subject relative to the frame, and is coupled to receive and mix the electrical signals from the microphones in accordance with a directional response that is adjusted responsively to the detected angle of orientation of the head so as to generate a combined audio signal for output via the one or more earphones; wherein the sensing and processing circuitry comprises: at least one first magnetic field transducer fixed to at least one of the earphones; at least one second magnetic field transducer fixed to the frame; and a processor, which is configured to sense a mutual inductance between the first and second magnetic field transducers, and to detect the angle of orientation of the head responsively to the sensed mutual inductance.

2. The apparatus according to claim 1, wherein the directional response specifies a beam direction and an angular aperture around the beam direction, wherein the acoustical inputs within the angular aperture are emphasized in the combined audio signal, while the acoustical inputs outside the angular aperture are suppressed.

3. The apparatus according to claim 1, wherein the first and second magnetic field transducers comprise coils, and wherein the processor is configured to drive one of the coils to generate a magnetic field, and to detect the angle of orientation by sensing an induced signal that is output by another of the coils in response to the magnetic field.

4. The apparatus according to claim 1, wherein the sensing and processing circuitry comprises:
a memory, which stores respective sets of beamforming coefficients that are precomputed for a plurality of different, predefined angles of orientation of the head; and
a processor, which is configured to select the sets of beamforming coefficients from the memory responsively to the detected angle of orientation of the head, and to apply the selected sets of the beamforming coefficients to the electrical signals produced by the microphones in order to generate the combined audio signal.

5. The apparatus according to claim 4, wherein the processor is configured to interpolate between the beamforming coefficients in two or more of the sets in order to adjust the directional response of the combined audio signal as the head turns.

6. The apparatus according to claim 4, wherein the processor is configured to test a noise level in the respective electrical signals and upon detecting that the noise level produced by a given microphone has exceeded a predefined threshold, to substitute an electrical signal from a neighboring microphone for that of the given microphone in generating the combined audio signal.

7. The apparatus according to claim 1, wherein the frame comprises a neckband, which is sized and shaped to be worn around a neck of the human subject.

8. A method for hearing assistance, comprising: providing a frame, which is sized and shaped to be worn on a part of a body of a human subject, with an array of microphones distributed at different, respective locations on the frame;
detecting an angle of orientation of a head of the human subject relative to the frame;
receiving and mixing respective electrical signals output by the microphones in accordance with a directional response that is adjusted responsively to the detected angle of orientation of the head so as to generate a combined audio signal; and
outputting the combined audio signal via one or more earphones configured to be worn in the ears of the human subject; wherein detecting the angle of orientation comprises sensing a mutual inductance between at least one first magnetic field transducer fixed to at least one of the earphones and at least one second magnetic field transducer fixed to the frame.

9. The method according to claim 8, wherein mixing the electrical signals comprises generating the combined audio signal in accordance with a directional response that specifies a beam direction and an angular aperture around the beam direction, wherein the acoustical inputs within the angular aperture are emphasized in the combined audio signal, while the acoustical inputs outside the angular aperture are suppressed.

10. The method according to claim 8, wherein the first and second magnetic field transducers comprise coils, and wherein sensing the mutual inductance comprises driving one of the coils to generate a magnetic field, and sensing an induced signal that is output by another of the coils in response to the magnetic field.

11. The method according to claim 8, wherein mixing the respective electrical signals comprises:
storing in a memory respective sets of beamforming coefficients that are precomputed for a plurality of different, predefined angles of orientation of the head; and
selecting the sets of beamforming coefficients from the memory responsively to the detected angle of orientation of the head, and applying the selected sets of the beamforming coefficients to the electrical signals produced by the microphones in order to generate the combined audio signal.

12. The method according to claim 11, wherein mixing the respective electrical signals comprises interpolating between the beamforming coefficients in two or more of the sets in order to adjust the directional response of the combined audio signal as the head turns.

13. The method according to claim 8, wherein mixing the respective electrical signals comprises testing a noise level in the respective electrical signals and upon detecting that the noise level produced by a given microphone has exceeded a predefined threshold, substituting an electrical signal from a neighboring microphone for that of the given microphone in generating the combined audio signal.

14. The method according to claim 8, wherein the frame comprises a neckband, which is sized and shaped to be worn around a neck of the human subject.

* * * * *